May 27, 1941.  G. DEN BESTEN  2,243,552
TRACTOR STOP HITCH
Filed Dec. 20, 1938  4 Sheets-Sheet 1
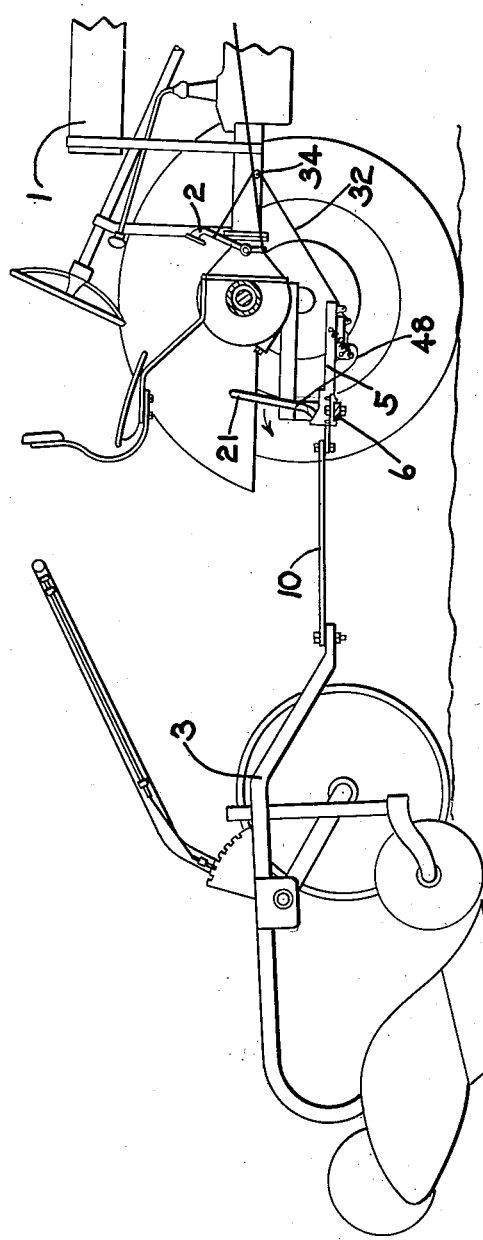
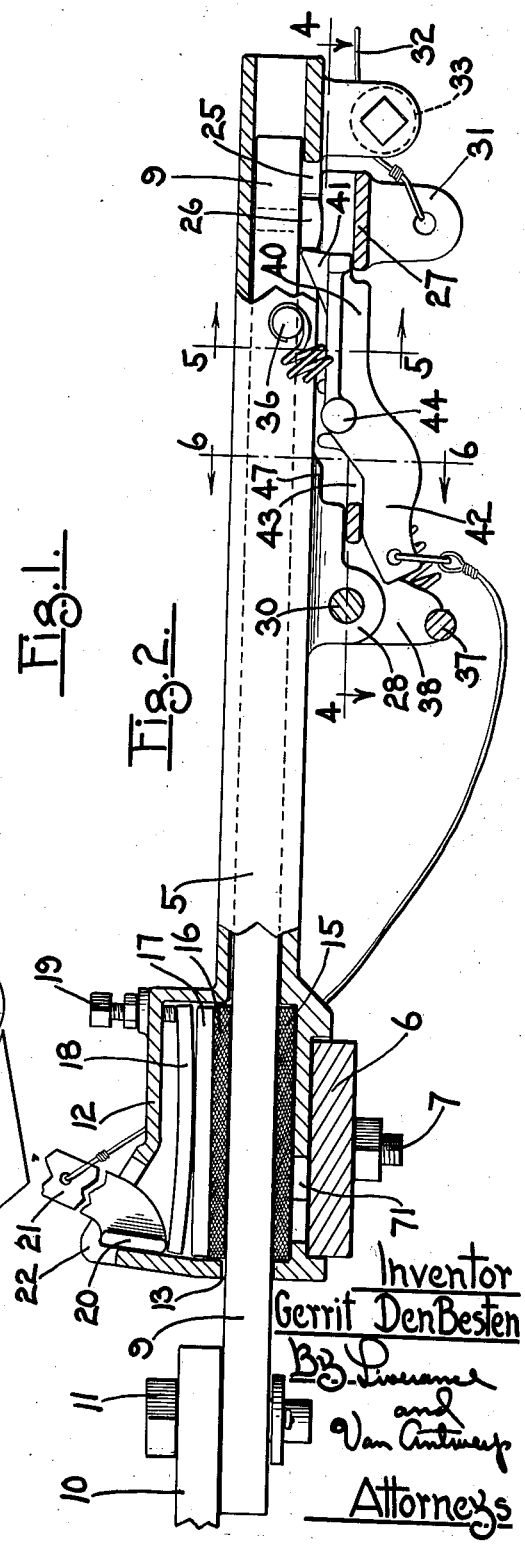
Fig.1.
Fig.2.
Inventor
Gerrit DenBesten
By B. Livermore
and
Van Antwerp
Attorneys

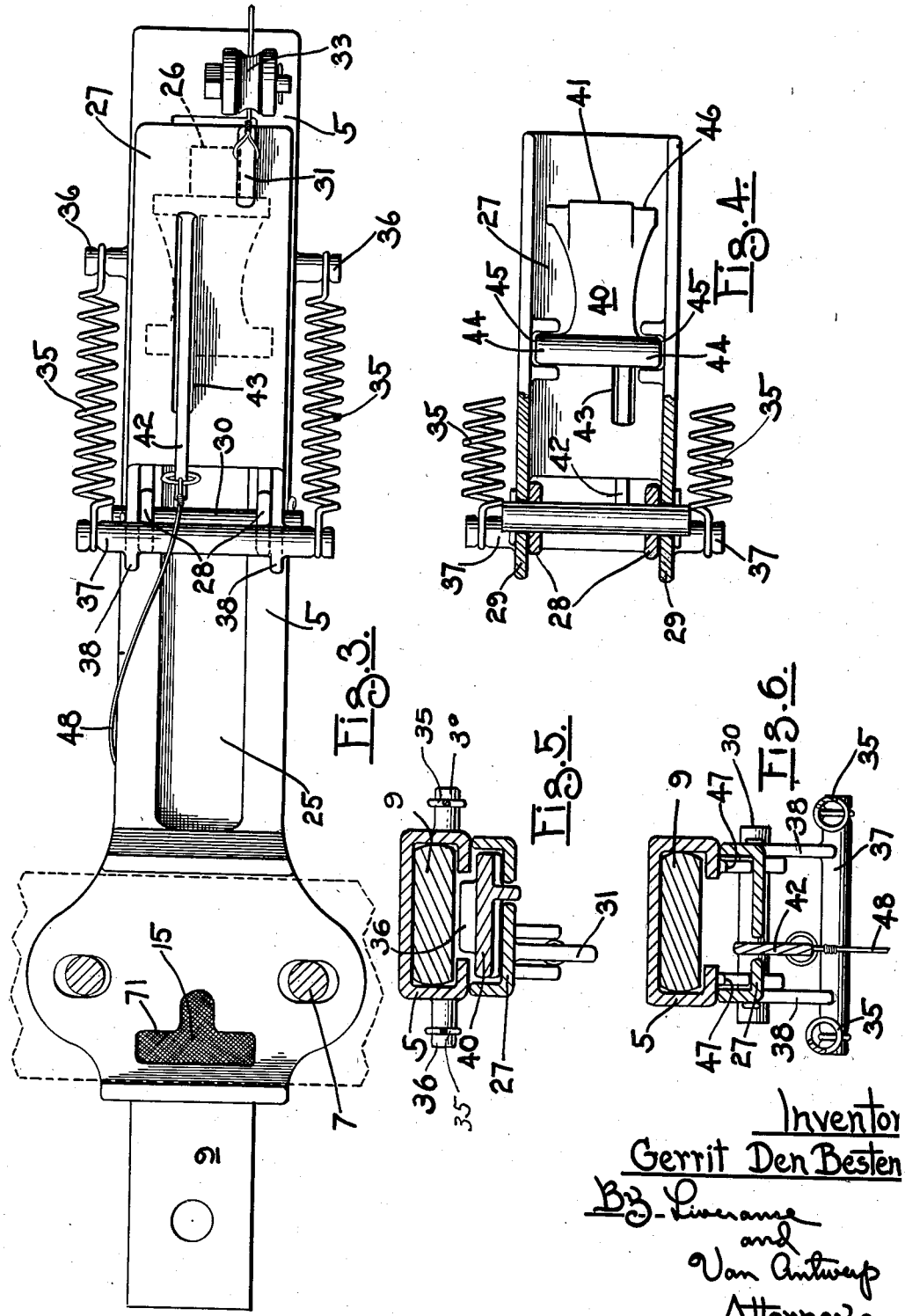

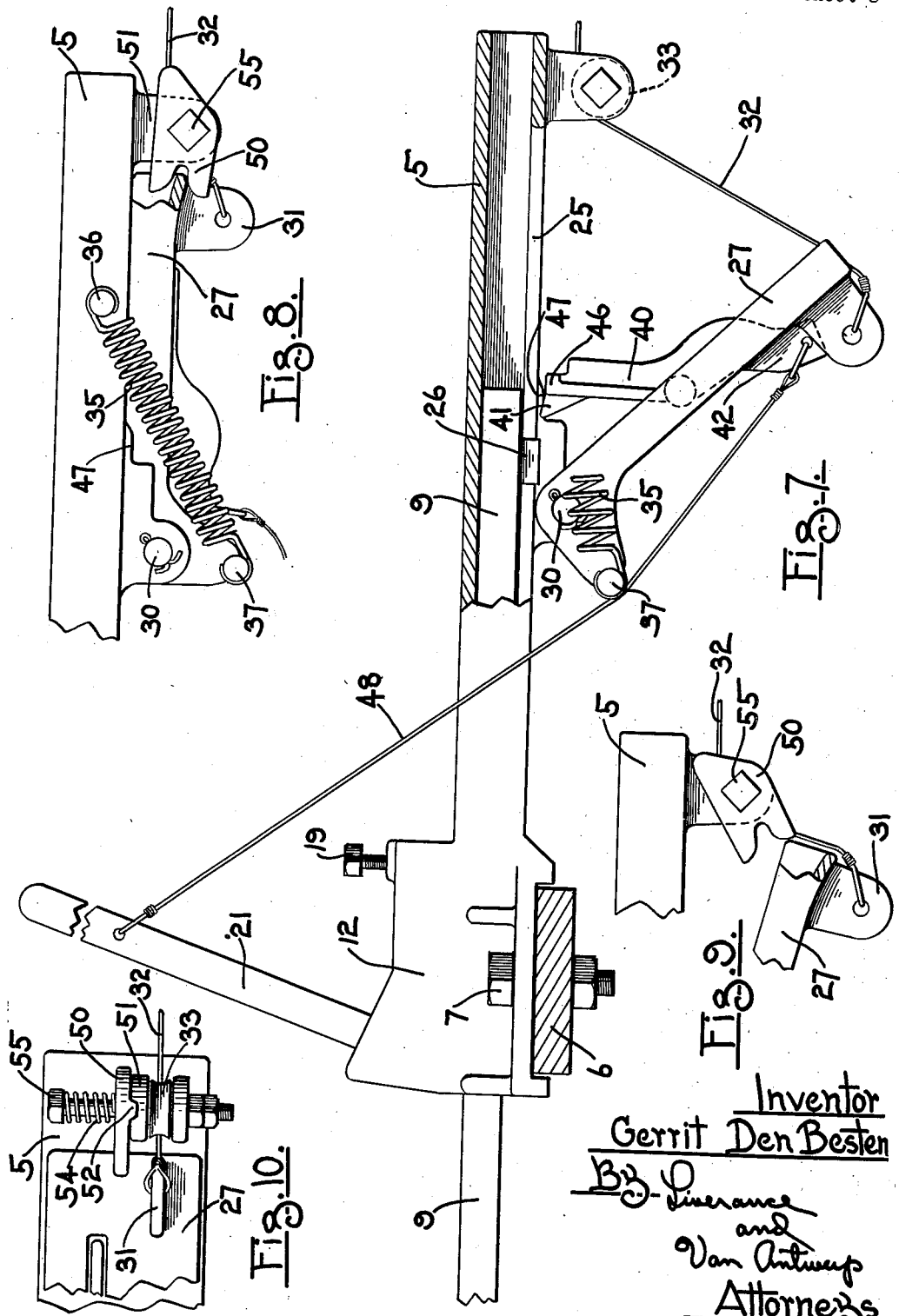

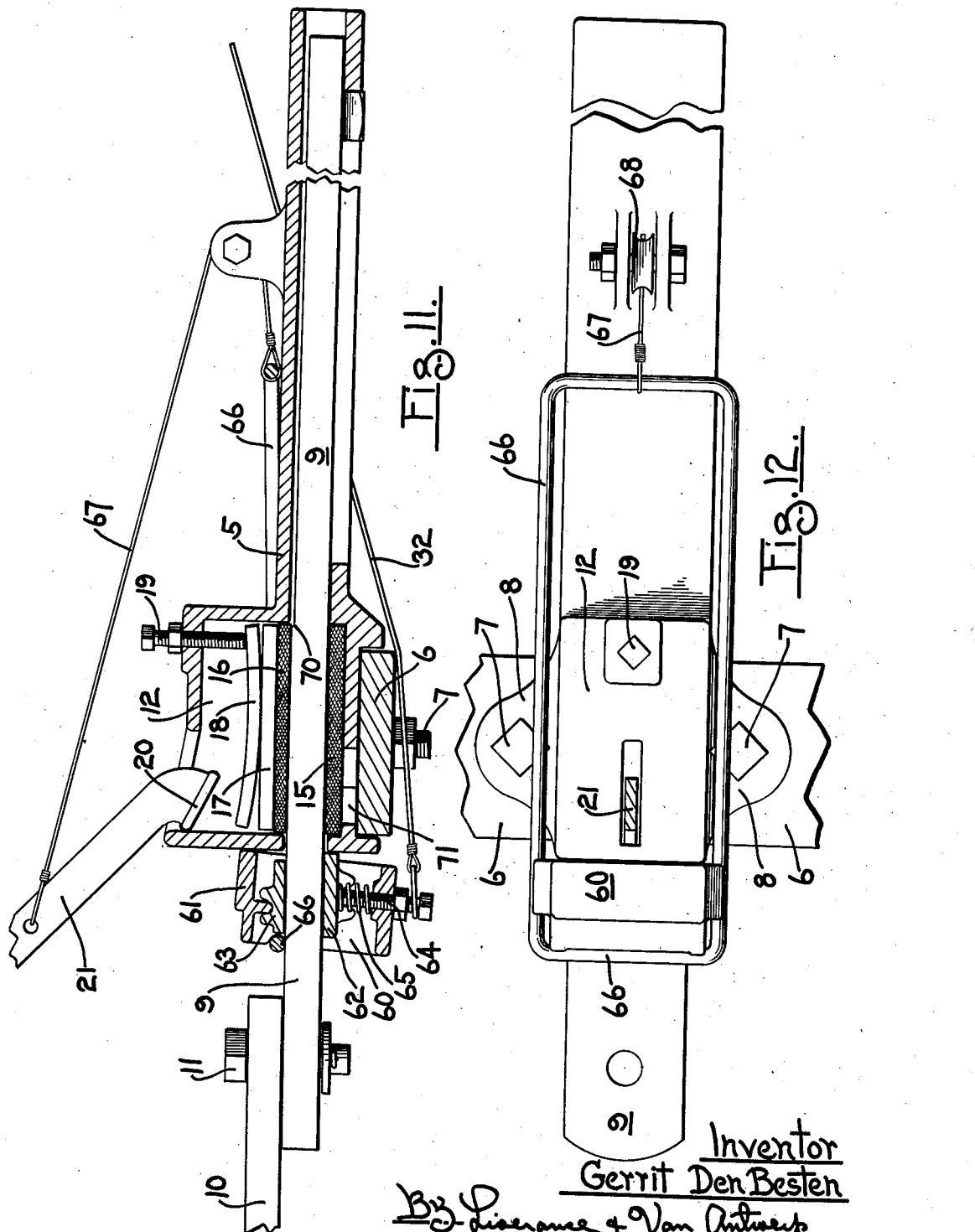

Patented May 27, 1941

2,243,552

UNITED STATES PATENT OFFICE 2,243,552

TRACTOR STOP HITCH

Gerrit Den Besten, Pella, Iowa, assignor of one-fourth to Liverance & Van Antwerp, Grand Rapids, Mich., a co-partnership composed of Frank E. Liverance, Jr., and Harold O. Van Antwerp Application December 20, 1938, Serial No. 246,881

10 Claims. (Cl. 180—14.5)

This invention relates to tractor stop hitches. Hitches of this type are for the purpose of connecting two vehicles, such as a tractor with a farm implement, and are yieldable or extensible under abnormal load, as when the implement strikes an obstruction, and they also include means for releasing the clutch of a tractor so that it will stop when the hitch yields under such conditions.

The present invention provides means in a device as above described for applying a braking action upon the vehicle during extending movement of the clutch when the implement strikes an obstacle so that not only the tractor clutch will be released but the movement of the tractor will be gradually stopped within a short distance by such braking action. The present invention also includes means to produce a certain predetermined resistance to initial movement of the hitch members and to decrease such resistance after the initial movement and to continue a considerable resistance to movement during the remainder thereof.

The object of the means to reduce the resistance after the initial movement is to prevent only partial extension of the hitch members which would result in partial release of the clutch of the tractor and cause undesirable "slipping" of the clutch. In other words, if there was the same resistance to extension of the clutch members throughout the full travel it would be possible under some conditions for the implement to strike an obstacle which would exert sufficient resistance to cause partial extension of the hitch members but the obstacle may then be thrust away and the implement continue in its way with the hitch partly extended. If this should occur several times the hitch could become sufficiently extended to partially release the clutch of the tractor and cause it to slip. With the means for reducing the braking tension after initial movement of the hitch members the above objectionable action is avoided. With this feature, when the implement strikes an obstacle having sufficient resistance to overcome the initial resistance of the hitch and perform the first part of the extension movement then it is quite certain that the obstacle will cause the implement to remain stationary throughout the entire remainder of extension of the hitch members which occurs under reduced resistance but still having ample resistance to act as a brake to stop the movement of the tractor and this entire extension of the hitch will entirely release the tractor clutch and make it necessary for the hitch to be reset to its normal initial position before the tractor can again be operated.

The invention provides various other novel features of construction and arrangement, and particularly simplicity, economy and durability of construction as hereinafter more fully described and particularly pointed out in the claims, reference being had to the accompanying drawings in in which:

Fig. 1 is a diagrammatic illustration of the rear part of a conventional tractor and a plow with a hitch embodying this invention operatively connecting the two.

Fig. 2 is a side elevation, partly in section, of one form of hitch embodying this invention shown in telescoped or retracted position.

Fig. 3 is a bottom view of the hitch shown in Fig. 2.

Fig. 4 is a plan view taken on the section line 4—4 of Fig. 2 showing the clutch pulling arm and overload catch.

Fig. 5 is a transverse section on the line 5—5 of Fig. 2.

Fig. 6 is a transverse section on the line 6—6 of Fig. 2.

Fig. 7 shows the hitch of Fig. 2 partially extended and with the clutch pulling arm in clutch pulling position.

Fig. 8 shows one end of a modified form of hitch having an additional overload or initial tension device.

Fig. 9 is a fragmentary view of the parts of Fig. 8 shown in partially extended position.

Fig. 10 is a bottom view of a fragment of the device shown in Fig. 8.

Fig. 11 is a longitudinal sectional elevation of a second modified structure, and Fig. 12 is a plan view of the device of Fig. 11.

Like reference numbers refer to like parts in all of the figures.

I represents a tractor of conventional structure which is provided with a conventional clutch which releasably connects the power unit with the driving mechanism. It is not considered necessary to illustrate such a clutch since it is well known and used on all automotive vehicles. The clutch is released in the usual way by depressing a foot pedal 2 and engaged by releasing said pedal. 3 represents a conventional plow which, so far as this invention is concerned, may be any object drawn by the tractor.

Referring to the hitch structure of Figs. 2, 3, 4, 5, 6 and 7, 5 is the body which preferably is made of cast metal such as malleable iron. This body may be generally termed the pulling member of the hitch and is attached to the drawbar 6 of the tractor by suitable means such as bolts 7 passing through ears 8 on the body. 9 is that part of the hitch which may be called the pulled member and consists of an elongated bar connected to the beam 10 of the implement by any conventional means such as a bolt 11.

The body 5 is in the nature of an elongated rectangular tube open at both ends and having an enlargement in the nature of a housing 12 at its rear end which directly communicates with the interior of the body 5 and is provided with an opening 13 in its outer end in alinement with the interior of the housing 5. The bar 9 extends through the opening 13 and the housing 12 and into the body 5 and is slidable therein.

Brake elements or shoes 15 and 16 are located below and above the bar 9 in the housing 12 and are suitably anchored in place as by being located in recesses in the housing. These friction shoes 15 and 16 may be of material commonly known in the automotive industry as brake lining or of any suitable material which has good friction and wear resisting qualities. A stiff backing 17 is located above the upper friction shoe 16. A leaf spring 18 bowed from its center upward lies upon the backing portion 17 of the friction shoe 16 and is engaged at its forward end by an adjusting screw 19 and at its opposite or rear end by the cam portion 20 of a hand actuated tension lever 21.

A slot 22 is provided in the upper side of the housing 12 through which the hand lever 21 extends and operates. The upper rear part of the housing 12 is inclined upwardly and where it joins the rear wall of the housing it forms a pocket in which the upper edge of the cam portion 20 of the lever 21 seats, this cam portion being in the nature of lateral extensions from the lower end of the lever 21. When the upper end of the hand lever 21 is moved forwardly the cam 20 assumes the position shown in Fig. 2 and presses upon the rear end of the spring 18 exerting spring tension upon the friction shoe 16 and gripping the bar 9 between the shoes 15 and 16. The tension of this frictional grip, which constitutes a considerable part of the load pulling capacity of the hitch, is adjusted by the screw 19 by means of which the tension exerted by the spring 18 may be varied from nothing to the full capacity of the spring.

The under side of the body 5 is provided with an elongated slot 25. A stop 26, which may be formed by the square head of a bolt, projects from the lower side of the bar 9 near its forward end and extends into the slot 25 and is adapted to move lengthwise of the slot during extension of the hitch. Under some conditions the stop 26 will engage the rear end of the slot 25 thus constituting a definite limit to the hitch extension.

A clutch pulling arm 27 is pivotally connected to the under side of the body 5. For this purpose the body has two downwardly extending ears 28 and the arm 27 has two spaced rearward projections 29 which straddle the ears and a pivot pin 30 passes through them. At the forward end of the arm 27 is a downwardly extending ear 31 to which is attached a clutch pulling cable 32 which passes over a pulley 33 mounted on the lower side of the body 5. The cable 32 extends forwardly and is connected to the clutch pedal 2 of the tractor. Various means of connecting the cable 32 to the clutch pedal 2 may be used, the illustration showing the cable 32 passing over a pulley 34 and thence being connected to the pedal 2. Coiled springs 35 are anchored at their forward ends to pins 36 extending from the sides of the body 5 and at their rear ends they are connected to pins 37 extending from downwardly turned bell crank portions 38 on the rearward projections 29 of the arm 27. These springs normally act to hold the clutch pulling arm 27 upward against the underside of the body 5 in which position the cable 32 is slackened permitting the clutch pedal 2 to move in a direction to engage the clutch of the tractor which is the normal pulling position of the hitch.

An overload pawl 40 is pivoted to the upper side of the clutch pulling arm 27. It comprises a forward pawl element 41 lying above the body of the arm 27 and a release lever 42 extending through a slot 43 in the arm 27. At its middle portion the pawl is provided with trunnions 44 which rest in sockets 45 provided on the arm 27 and constitute a pivot for the pawl. Shoulders 46 are located on opposite sides of the pawl element 41 which ride onto cams 47 on the under side of the body. When in normal position as shown in Fig. 2 the pawl 41 lies behind the stop 26 on the bar 9 and in engagement with it.

*Operation of structure of Figs. 2, 3, 4, 5, 6 and 7*

The hitch as described forms the pulling connection between the tractor and the implement when in normal position shown in Fig. 2. The pulling effort is exerted partly through the frictional resistance of shoes 15 and 16 on the bar 9 and partly through the overload resistance of the pawl 41 acting against the stop 26. The spring 18 is to be adjusted by means of screw 19 so that the friction of the shoes 15 and 16 combined with the resistance offered by the overload pawl will be sufficient to pull the normal load but when an abnormal load is applied to the hitch the parts will yield permitting extension of the hitch by a movement of the bar 9 rearwardly in the housing 5.

The overload pawl 40 offers resistance to extension of the housing in the following way: The springs 35 tend to hold the swinging part of the clutch pulling arm 27 upward against the under side of the body 5. In order for the bar 9 to move backwardly the pawl 40 must act to swing the arm 27 downwardly against tension of the spring 35. This initial resistance to movement is considerable because the point of contact of the pawl 41 with the stop 26, the axes of the trunnions 44 which pivotally connect the pawl 40 with the arm 27 and the axis of the pin 30 which forms the pivot on which the arm swings are nearly in alinement and therefore at the initial movement the leverage acting to extend the springs 35 is very little although it is sufficient so that when enough abnormal load is exerted upon the hitch the stop 26 thrusting against the pawl 41 will move the swinging end of the arm 27 downwardly. As this movement continues the leverage of the parts increases offering less and less resistance until finally the shoulders 46 on the pawl body 40 will ride upon cams 47 on the under side of the body 5 and the pawl 41 will have been swung to a position where it will release from the stop 26 as shown in Fig. 7, after which the overload mechanism offers no further resistance to extension of the hitch but the bar 9 may still move in the body 5 under frictional resistance of the shoes 15 and 16. For best results the overload or additional initial resistance should cease or be decreased before release of the tractor clutch.

During the swinging movement of the clutch pulling arm 27 the cable 32 will have pulled the clutch pedal 2 sufficiently to completely release the tractor clutch so that no further pulling effort is made by the tractor other than its momentum. The momentum of the tractor is definitely but gradually overcome, after release of its clutch, by the frictional resistance of the shoes 15 and 16 on the bar 9 and it is assumed that this resistance will have been adjusted to sufficient tension so that the momentum of the tractor will be stopped before the hitch has reached the limit of its extension.

The clutch pulling arm 27 is held in its clutch pulled position by the pawl 40 which acts as a prop, the shoulders of which rest upon the cams 47 but the clutch may be reengaged by releasing the cam 40 from its prop position which is done by pulling forwardly the releasing portion 42 of the pawl body 40 which allows the springs 25 to return the clutch pulling arm 27 to its normal position close against the under side of the body 5. When this is done the tractor operator may freely manipulate the clutch into engaged position.

For convenience the cable 48 which is attached to the releasing lever 42 of the pawl body is also connected to the hand lever 21 so that rearward movement of this lever releases the pawl 40 and at the same time moves the cam 29 to the position shown in Fig. 11 in which it releases the tension on the spring 18 so that the friction shoes 15 and 16 release their grip upon the bar 9. When this is done the tractor is moved backward to retract the clutch parts moving the bar 9 into the body 5 to its normal position during which movement the stop 26 will ride over the pawl 41 and assume its position in front of it. After the parts have been thus retracted the lever 21 is moved forwardly reengaging the cams 29 with the spring 18 which is again put under tension and the hitch is completely reset for normal operation.

*The modification of Figs. 8, 9 and 10*

This modified structure is identical with that previously described excepting that it has an additional overload catch. A forked detent 50 is pivoted to an ear 51 on the under side of the body 5, which ear may be one of those mounting the pulley 33, and its forked portion straddles the forward end of the clutch pulling arm 27. The detent 50 is provided in its surface adjacent the ear 51 with a rib 52, having inclined side walls, and a corresponding groove 53 is provided in the adjacent side of the ear 51. This rib and groove are so located that the rib lies within the groove when the detent is in position to embrace the end of the arm 27 as shown in Fig. 8.

A spring 54 surrounds the pivot bolt 55 and yieldably presses the detent 50 toward the ear 51, but under effort, such as by movement of the arm 27, the detent may be rotated causing the rib 52 to rise out of the groove 53 compressing the spring 54. The extent of this resistance to rotation may be governed by adjustment of the tension of the spring 54 and this additional resistance offers an additional initial resistance to extension of the hitch. Upon return movement of the arm 27 to normal position its forward end will reenter the bifurcation of the detent 50, returning it to normal position where its rib 52 will reenter the slot 53.

*The modification of Figs. 11 and 12*

This structure utilizes a different type of clutch puller and means for high initial resistance to movement than the structures previously described. In this device the clutch pulling element is in the nature of an anchor 60 mounted on the bar 9. This anchor is of the type which pinches upon the bar 9 when forward pull is exerted upon its lower side, but which releases so that it may be slid upon the bar when forward pressure is exerted upon its under side. It has an outer frame 61 surrounding the bar 9 and an upper and lower friction shoe 62 and 63 engaging the bar 9 and mounted upon the frame 61 by connection therewith at upper and lower staggered points, the lower connection with the frame 61 being forward of the upper connection. The cable 32 is connected with the lower part of the anchor 60, as to the bolt 64 which serves as the connection between the frame 61 and the lower shoe 62. A spring 65 may be used to assure contact of the shoes with the bar 9.

When the parts extend under abnormal load the body 5 will move forwardly relative to the bar 9 and the pull of the cable 32 upon the lower part of the anchor 60 will cause it to grip the bar and remain stationary thereon so that as the tractor moves forward the cable will release its clutch by pulling upon the pedal 2. After the parts have been extended sufficiently to cause full clutch release, a bail 66 which surrounds the housing 12 and extends rearwardly behind the upper part of the anchor 60 will be engaged and will pull upon the anchor 60 upon further extension of the hitch parts, and since this pull is exerted upon the upper part of the anchor it will tip it sufficiently to release its pinching grip upon the bar 9 causing it to move forwardly with the body 5 and the tractor, holding the clutch in disengaged position but causing no further disengaging movement of it.

When the lever 21 is moved rearwardly to release tension on the spring 18, as previously described, a cable 67 attached to it and extending around a pulley 68 and connected with the forward end of the bail 66 will pull the anchor 60 forward into position against the rear end of the housing 12, thus releasing the cable 32 and permitting the tractor clutch to be reengaged.

Upon return movement of the parts in which the bar 9 is moved into the body 5, the anchor will be pushed backward by its contact with the rear side of the housing 12. To prevent pinching upon the bar during this return sliding movement of the anchor, its lower shoe 62 is extended forwardly and is that part which engages the housing 12 and rearward thrust upon the lower shoe 62 causes the anchor to ungrip the bar 9.

The overload structure of this modification consists simply of decreasing the thickness of the bar 9 forwardly of that portion which is gripped between the shoes 15 and 16 in normal pulling position. In other words, the bar 9 has a certain thickness at its rear portion and where the shoes 15 and 16 grip it in normal position, and its thickness is reduced at 70 and forwardly thereof sufficiently so that after initial movement and after the shoes have passed from the thickened portion, they will move together sufficiently, by reason of engaging the thinner portion of the bar, to slightly decrease the tension of the spring 18, thereby releasing the tension of the frictional resistance. This structure will give the same strong resistance to movement during initial extension, followed by a decrease of this resistance but a continued application of a breaking resistance which will insure full clutch disengagement and at the same time stop the momentum of the tractor.

Extreme simplicity of design and structure are obtained by this invention. For example, the body and integral housing 12 are substantially ready for assembly and use after casting, with practically no machine work. The threaded hole for the adjusting screw 19 is the only necessary machine work on this part. The bottom wall of the housing 12 is provided with an opening 71 through which the hand lever 21 with its laterally projecting cams 20 may be passed in assembling. After the lever 21 has been inserted in place the spring 18 and the shoes 15 and 16 are inserted into the housing through the opening 13 and the bar 9 is then inserted between the shoes and the spring 19 tightened to exert tension of the spring 18. The other parts of the device are of the same simple nature, most of which require no machine work whatever.

I claim:

1. The combination with a tractor having a clutch and an implement to be pulled thereby, of a hitch connecting said tractor to said implement comprising a pulling member and a pulled member movable relative to each other and having a normal pulling position, friction means to uniformly resist movement of said members relative to each other throughout the entire distance, said friction means being sufficient to stop momentum of said tractor within the relative movement of said members, means to exert additional resistance to the initial movement of said members from said normal position and means actuated by the first part of the movement of said members to release the said clutch of said tractor.

2. The combination with a tractor having a clutch and an implement, of a hitch connecting the tractor to the implement comprising a pulling member attached to the tractor and a pulled member attached to the implement, said members being movable relative to each other and having a normal pulling position, friction means to exert resistance to movement of said members throughout the entire distance, a swinging arm mounted on said pulling member, means connecting the swinging end of said arm with said tractor clutch, yieldable means normally retaining said arm in clutch engaging position, and means actuated during the first part of movement of said members from normal position for swinging said arm against action of said yieldable means in a direction to release said clutch.

3. The elements in combination defined in claim 2 combined with means for releasing said frictional resistance and means actuated by said releasing means to reset said arm into clutch engaging position.

4. A hitch of the class described comprising a body and a bar, movable relative to each other and having a normal pulling position, said bar having one portion of greater thickness and another portion of a lesser thickness and friction means on said body engaging said bar at its greater thickness when said parts are in normal position and moving into engagement with said bar at its lesser thickness when the parts are moved from normal position.

5. The combination with a tractor and an implement of a hitch connecting said tractor having a clutch and an implement comprising a body connected to one of said devices and a bar connected to the other of said devices movable relative to each other and having a normal pulling position, said bar having one portion of greater thickness and another portion of lesser thickness, friction means on said body engaging said bar at its greater thickness when said parts are in normal position and moving to engage said bar at its lesser thickness when said parts are moved from normal position and means actuated by movement of said parts from normal position to release the said tractor clutch.

6. The elements defined in claim 5 combined with manual means for releasing the frictional engagement of said bar.

7. The elements in combination defined in claim 5 combined with manual means for releasing the frictional engagement of said bar and also automatically resetting said clutch operating means to clutch engaged position.

8. A hitch of the class described comprising, a pulling member and a pulled member movable relative to each other and having a normal operating position, friction means to resist movement of said members relative to each other throughout the entire distance, a pair of toggle levers pivotally connected together, one of said levers being pivotally connected to one of said members and the other of said levers being in engagement with the other of said members, said toggle levers being in nearly straight line position when the device is in normal operating position and yieldable means resisting movement of said levers from said normal position.

9. The elements in combination defined in claim 8, combined with a tractor having a clutch, said hitch being attached to said tractor and means connecting said clutch to one of said toggle levers acting to disengage said clutch when said toggle levers are moved from normal position.

10. The elements in combination defined in claim 8, in which one of said levers is disconnectable from one of said members and means on the other of said members for disconnecting said one lever at a predetermined point in its movement.

GERRIT DEN BESTEN.